United States Patent
Jornod et al.

(10) Patent No.: US 12,131,635 B2
(45) Date of Patent: Oct. 29, 2024

(54) METHODS, COMPUTER PROGRAMS, COMMUNICATION CIRCUITS FOR COMMUNICATING IN A TELE-OPERATED DRIVING SESSION, VEHICLE AND REMOTE CONTROL CENTER FOR CONTROLLING A VEHICLE FROM REMOTE

(71) Applicant: VOLKSWAGEN AKTIENGESELLSCHAFT, Wolfsburg (DE)

(72) Inventors: Guillaume Jornod, Berlin (DE); Andreas Pfadler, Berlin (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 63 days.

(21) Appl. No.: 17/491,876

(22) Filed: Oct. 1, 2021

(65) Prior Publication Data
US 2022/0108608 A1  Apr. 7, 2022

(30) Foreign Application Priority Data
Oct. 1, 2020 (EP) .................................. 20199694

(51) Int. Cl.
*G08G 1/09* (2006.01)
*G05D 1/00* (2006.01)
(Continued)

(52) U.S. Cl.
CPC .............. *G08G 1/09* (2013.01); *G05D 1/0022* (2013.01); *H04L 67/141* (2013.01); *H04W 4/46* (2018.02)

(58) Field of Classification Search
CPC ............... G08G 1/09; G08G 1/096741; G08G 1/09675; G08G 1/096783;
(Continued)

(56) References Cited

U.S. PATENT DOCUMENTS

| | | |
|---|---|---|
| 10,575,181 B2 | 2/2020 | Lei |
| 2018/0224844 A1 | 8/2018 | Zhang et al. |

(Continued)

FOREIGN PATENT DOCUMENTS

| | | |
|---|---|---|
| CN | 107925426 A | 4/2018 |
| CN | 109808705 A | 5/2019 |

(Continued)

OTHER PUBLICATIONS

Search Report for European Patent Application No. 20199694.9; dated Mar. 19, 2021.

(Continued)

*Primary Examiner* — Behrang Badii
(74) *Attorney, Agent, or Firm* — Barnes & Thornburg LLP

(57) ABSTRACT

Methods, computer programs, communication circuits for communicating in a tele-operated driving session, a transportation vehicle and a remote control center for remotely controlling a transportation vehicle. The method for a transportation vehicle and communicating in a tele-operated driving session between the transportation vehicle and a remote control center includes establishing the tele-operated driving session, the transportation vehicle receiving a message including information on the environment of the transportation vehicle from a traffic entity outside the transportation vehicle, and the transportation vehicle transmitting the information to the remote control center for remotely controlling the transportation vehicle based on the information.

26 Claims, 3 Drawing Sheets

(51) Int. Cl.
*H04L 67/141* (2022.01)
*H04W 4/46* (2018.01)

(58) Field of Classification Search
CPC ........... G08G 1/096791; G05D 1/0022; G05D 1/0038; G05D 2201/0213; H04L 67/141; H04W 4/46
See application file for complete search history.

(56) References Cited

U.S. PATENT DOCUMENTS

| | | | |
|---|---|---|---|
| 2018/0267558 A1* | 9/2018 | Tiwari | G05D 1/0038 |
| 2019/0171202 A1 | 6/2019 | Fairfield et al. | |
| 2019/0302761 A1* | 10/2019 | Huang | G05D 1/0016 |
| 2019/0339082 A1 | 11/2019 | Doig et al. | |
| 2020/0004240 A1* | 1/2020 | Biehler | G05D 1/0016 |
| 2020/0204952 A1 | 6/2020 | Sorrentino | |
| 2021/0107526 A1* | 4/2021 | Nozaki | B60W 60/0057 |

FOREIGN PATENT DOCUMENTS

| | | |
|---|---|---|
| EP | 3690853 A1 | 8/2020 |
| KR | 20190130626 A | 11/2019 |
| WO | 2015180090 A1 | 12/2015 |

OTHER PUBLICATIONS

Office Action; European Patent Application No. 20199694.9; dated Mar. 2, 2023.
Office Action; Chinese Patent Application No. 202111157373.6; Apr. 10, 2024.

* cited by examiner

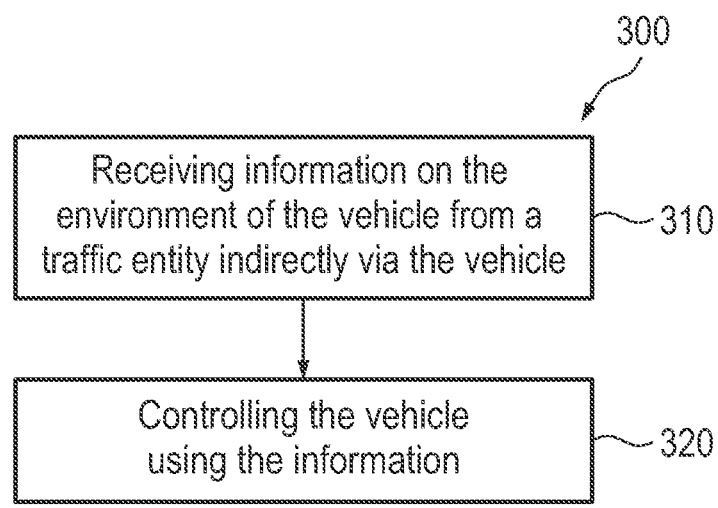
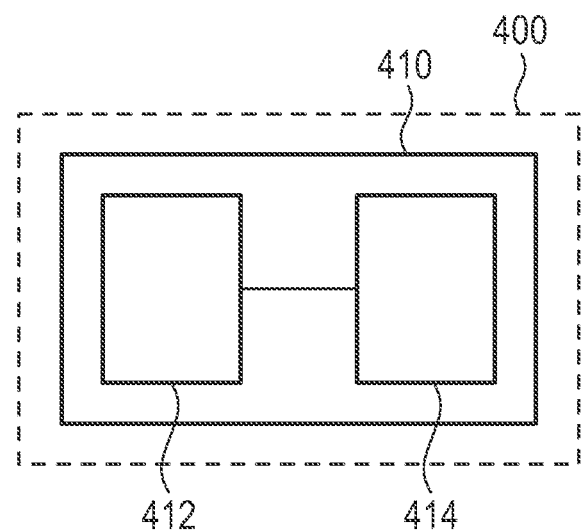

METHODS, COMPUTER PROGRAMS, COMMUNICATION CIRCUITS FOR COMMUNICATING IN A TELE-OPERATED DRIVING SESSION, VEHICLE AND REMOTE CONTROL CENTER FOR CONTROLLING A VEHICLE FROM REMOTE

PRIORITY CLAIM

This patent application claims priority to European Patent Application No. 20199694.9, filed 1 Oct. 2020, the disclosure of which is incorporated herein by reference in its entirety.

SUMMARY

Illustrative embodiments relate to methods, computer programs, communication circuits for communicating in a tele-operated driving session, transportation vehicle and remote control center for controlling a transportation vehicle from remote, more specifically, but not exclusively, to a concept for providing messages locally available for a transportation vehicle to a remote control center.

BRIEF DESCRIPTION OF THE DRAWINGS

Disclosed embodiments will be described in more detail below with reference to the figures, in which:

FIG. 3 illustrates a block diagram of an exemplary embodiment of a method for a remote control center and for communicating in a tele-operated driving session between a transportation vehicle and a remote control center;

FIG. 4 illustrates a block diagram of an exemplary embodiment of a communication circuit for a remote control center.

DETAILED DESCRIPTION

Figure 1:
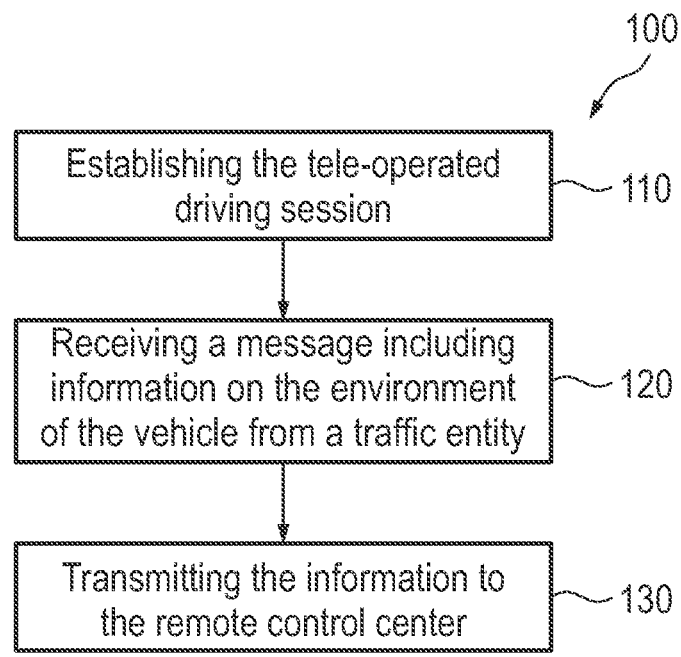
FIG. 1 illustrates a block diagram of an exemplary embodiment of a method for a transportation vehicle and for communicating in a tele-operated driving session between the transportation vehicle and a remote control center.

Vehicular communication is a field of research and development. To enable autonomous or semi-autonomous driving of transportation vehicles, such transportation vehicles can (inter alia) use information on their environment from communication via, e.g., dedicated short-range communication (DSRC) with other transportation vehicles or fixed installed transmitter in the environment of the transportation vehicle. To handle so-called "deadlock situations", autonomous or semi-autonomous driving of transportation vehicles can be controlled using tele-operated driving (ToD). The main concept of ToD is that an automated vehicle (AV) is remotely driven by a remote control/command center (CC). CC and AV may be far away from each other.

Document US 2018/0224844 A1 describes a concept for vehicular communication. The concept comprises sensing a condition associated with the autonomous vehicle, and initiating, by a controller in response to the sensing of the condition, communication pertaining to the autonomous vehicle between a transportation vehicle manager remote to the autonomous vehicle and an external agent external to the autonomous vehicle. The autonomous vehicle communication method further comprises controlling the autonomous vehicle remotely in response to a command that is based on the condition associated with the autonomous vehicle and the communication between the transportation vehicle manager and the external agent.

Document US 2019/0171202 A1 discloses a concept which enables an autonomous vehicle to request assistance from a remote operator in certain predetermined situations. The concept provides for determining a representation of an environment of an autonomous vehicle based on sensor data of the environment and identifying based on the representation a situation from a predetermined set of situations for which the autonomous vehicle will request remote assistance. The concept further includes sending a request for assistance to a remote assistor, the request including the representation of the environment and the identified situation. The method may additionally include receiving a response from the remote assistor indicating an autonomous operation. The method may also include causing the autonomous vehicle to perform the autonomous operation.

EP 3 690 853 A1 reveals a method for a transportation vehicle to determine a route section comprising operating the transportation vehicle in an automated driving mode and determining an exceptional traffic situation. The method further comprises transmitting information related to the exceptional traffic situation to a network component using a mobile communication system and receiving information related to driving instructions for the route section to overcome the exceptional traffic situation from the network component, wherein the receiving of the driving instructions comprises tele-operating the transportation vehicle along the route section to overcome the exceptional traffic situation. This prior art does not reveal receiving message comprising information on the environment directly form a traffic entity.

KR 2019 0130626 A reveals a method in a Wireless device comprising detecting, at a first time period, a first status of an object based on dynamic properties of the object and communicating the first status of the object to a network element. Further, the method comprises predicting, at a second time period after the first time period, a status of the object based on the first status of the object and detecting, at the second time period, a second status of the object based on dynamic properties of the object. Further, the method comprises upon determining that the predicted status is different than the second status, communicating the second status to the network element.

US 2019/339082 A1 reveals a method at a network element for collective perception in an intelligent transportation system. The method includes receiving from each of a plurality of intelligent transportation system stations, a local dynamic map and creating, based on the local dynamic map from each of the plurality of intelligent transportation system stations, a local collective perception map. Further, the method comprises distributing the local collective perception map to at least one of the plurality of intelligent transportation system stations.

The prior art concepts describe a concept for sharing information about the environment of a remotely controllable transportation vehicle with a tele-operation driver within a common mobile network. However, the prior art concepts do not share the full information available at the transportation vehicles.

Hence, there is a demand for an improved concept for communicating in a tele-operated driving session.

This demand may be satisfied by the subject-matter of the appended independent and dependent claims.

Disclosed embodiments are based on the finding that a transportation vehicle can be used for relaying information from a message (e.g., a cooperative awareness message (CAM), decentralized environmental notification message (DENM), signal phase and timing (SPaT), and/or a collective perception message (CPM)), which is locally available for the transportation vehicle, to a remote control center to benefit from the information, e.g., when controlling the transportation vehicle from remote. Hence, the CC is enabled to receive messages or information comprised in these messages (e.g., CAM, DENM, CPM, SPaT) which are merely locally available (i.e., receivable) for the AV. Therefore, the CC may be enabled to use information from such messages for the tele-operated driving. Disclosed embodiments may enable the tele-operation driver of a transportation vehicle to receive and use information locally available to the transportation vehicle.

Disclosed embodiments provide a method for a transportation vehicle and for communicating in a tele-operated driving session between the transportation vehicle and a remote control center. The method comprises establishing the tele-operated driving session. The method further comprises receiving, by the transportation vehicle, a message including information on the environment of the transportation vehicle from a traffic entity outside the transportation vehicle. Further, the method comprises transmitting, by the transportation vehicle, the information to the remote control center for controlling the transportation vehicle from remote based on the information. In other words, the method provides for forwarding the information from the message to the remote control center. In this way, the information from the message can be provided to the remote control center even if the remote control center is not recipient of the message from the traffic entity, e.g., if the remote control center is not able to receive the message or the remote control center is outside a transmission range of the traffic entity. In particular, the above method enables the remote control center to analyze, process, and/or use the information for controlling the transportation vehicle from remote. This may improve the control/operation of the transportation vehicle by the remote control center.

The method comprises receiving the message directly from the traffic entity. The traffic entity, for example, is another transportation vehicle or an infrastructure component configured to transmit the message. The transportation vehicle, e.g., receives the message directly via direct communication, e.g., device-to-device (D2D), vehicle-to-vehicle (V2V), car-to-car communication (C2C), vehicle-to-infrastructure (V2I), or vehicle-to-anything (V2X) communication. The direct communication can enable transmitting the message with lower latencies than other communication technologies.

In some exemplary embodiments, the method comprises receiving the message from the traffic entity via dedicated short-range communication, DSRC, and/or via geocast communication. Thus, the messages are transmitted in a predefined transmission range/reception area and (only) locally receivable/available for recipients within the predefined transmission range/reception area. Geocast communication and DSRC may exhibit a higher integrity/lower risk of manipulation and lower latentcies than cellular communication technologies.

In some exemplary embodiments, the method comprises transmitting the information via a cellular network to the remote control center. In this way, the transportation vehicle can transmit the information over larger distances to the remote control center than, e.g., using short-range communication technologies.

In some exemplary embodiments, the message includes at least one of a cooperative awareness message, CAM, a decentralized environmental notification message, DENM, a collective perception message, CPM, and a signal phase and timing, SPaT. Accordingly, the information may include information from the CAM, DENM, CPM, and/or the SPaT. Thus, the method can enable the remote control center to receive information from the CAM, DENM, CPM, and/or the SPaT and to use such information for controlling the transportation vehicle from remote, i.e., tele-operation of the transportation vehicle.

In some exemplary embodiments, the method comprises receiving a first message including first information on the environment of the transportation vehicle from a first traffic entity outside the transportation vehicle. The method can further comprise receiving at least one second message including second information on the environment of the transportation vehicle from a second traffic entity outside the transportation vehicle. Further, the method can comprise collecting the first and the second information in a data container. Additionally, the method can comprise transmitting the data container to the remote control center. In this way, the information from multiple messages can be provided to the remote control center. Consequently, an amount of information available for the remote control center for controlling the transportation vehicle from remote may be increased.

In particular, collecting the first information and the second information in the data container may comprise removing redundant information from the first and/or second information. This allows, e.g., to remove redundancies between the first and the second information and, thus, reduce a data size of the information to be transmitted to the remote control center. The first information, e.g., comprise inter alia redundant (e.g., partly corresponding to the second information) information on a position of another transportation vehicle. The method, e.g., provides for removing such redundant information from the first and/or second information before transmitting the first and the second information in the data container to the remote control center.

Other exemplary embodiments provide a method for a remote control center and for communicating in a tele-operated driving session between the transportation vehicle and a remote control center. The method comprises receiving, by the remote control center, information on the environment of the transportation vehicle from a traffic entity indirectly via the transportation vehicle. The method further comprises controlling the transportation vehicle based on the information. This, e.g., enables the remote control center to receive information which might (only) be available/receivable locally for the transportation vehicle and an improved tele-operation of the transportation vehicle.

In some exemplary embodiments, the method comprises processing the information into a human readable presentation of the information at the remote control center for controlling the transportation vehicle based on the human readable presentation of the information. Thus, a human tele-operating driver controlling the transportation vehicle via the remote control center can perceive the information.

Other exemplary embodiments provide a communication circuit for a transportation vehicle. The communication circuit comprises one or more interfaces configured to communicate in a communication network. The communication circuit further comprises a data processing circuit configured to control the one or more interfaces, wherein the data processing circuit is further configured to execute one of the methods for a transportation vehicle which are described herein. Other exemplary embodiments provide a transportation vehicle comprising an exemplary embodiment of such a communication circuit.

Other exemplary embodiments provide a communication circuit for a transportation vehicle. The communication circuit comprises one or more interfaces configured to communicate in a communication network. The communication circuit further comprises a data processing circuit configured to control the one or more interfaces, wherein the data processing circuit is further configured to execute one of the methods for a remote control center which are described herein. Other exemplary embodiments provide a transportation vehicle comprising an exemplary embodiment of such a communication circuit.

Disclosed embodiments further provide a computer program having a program code for performing one or more of the above described methods, when the computer program is executed on a computer, processor, or programmable hardware component. A further exemplary embodiment is a computer readable storage medium storing instructions which, when executed by a computer, processor, or programmable hardware component, cause the computer to implement one of the methods described herein.

Teleoperated Driving (ToD) is becoming a key enabler for automated driving. ToD may help to solve deadlock situations which cannot be solved by an automated driving transportation vehicle itself. ToD may also become a legal requirement for automated driving in an increasing number of countries.

Dedicated short-range communications (DSRC) has been designed to support intelligent transportation systems (ITSs). The rationale behind DSRC is that messages emitted via DSRC are only locally receivable, e.g., for the transportation vehicle. In ToD applications, a remote control center for controlling the transportation vehicle from remote may not be able to receive the messages via DSRC. Thus, the remote control center may not be able to profit from such messages emitted via DSRC.

Moreover, information included in the messages may be exhibit a machine readable representation. Thus, a human tele-operating driver controlling the remote control center may not be able to read/perceive the information.

Hence, there is a demand for an improved concept for communicating in a tele-operated driving session.

This demand may be satisfied by the embodiments described below.

FIG. 1 illustrates a block diagram of an exemplary embodiment of a method 100 for a transportation vehicle and for communicating in a tele-operated driving session between the transportation vehicle and a remote control center. Method 100 comprises establishing 110 the tele-operated driving session. The transportation vehicle can be an autonomous or semi-autonomous driving of transportation vehicle. In so-called "deadlock situations", in which the transportation vehicle cannot maneuver automatically/autonomously in a safe way, the transportation vehicle may initiate the tele-operated driving session between the transportation vehicle and the remote control center. Establishing 110 the tele-operated driving session, e.g., includes establishing a data connection or communication path to the remote control center. Optionally, establishing 110 the tele-operated driving further comprises sending a request to take control over the transportation vehicle by the remote control center and/or transmitting sensor data of the environment to the remote control center.

The tele-operated driving session can be understood as a part or the entirety of acts for controlling the transportation vehicle from remote and for communicating between the transportation vehicle and the remote control center.

Method 100 further comprises receiving 120, by the transportation vehicle, a message including information on the environment of the transportation vehicle from a traffic entity outside the transportation vehicle. The transportation vehicle, e.g., receives the message wirelessly via a radio signal emitted by the traffic entity. A skilled person having benefit from the present disclosure will appreciate that the transportation vehicle may comprise suitable technical methods or mechanisms for (wirelessly) receiving 120 the message. The traffic entity, e.g., is another transportation vehicle or a stationary transmitter (e.g., an infrastructure component for wirelessly emitting the message). The message, e.g., comprises or corresponds to a cooperative awareness message (CAM), a decentralized environmental notification message (DENM), a collective perception message (CPM) or signal phase and timing (SPaT), i.e., a message indicative of SPaT.

The CAM, e.g., includes inter alia information on a position and a velocity of another transportation vehicle in the environment of the transportation vehicle. The CPM, e.g., includes inter alia one or more trajectories of another transportation vehicle in the environment of the transportation vehicle. The DENM can contain a history of the last sent information. SPaT, e.g., is indicative of a state and timing of traffic lights. For example, the SPaT indicates when a traffic light is turned green, yellow, and/or red and/or when a traffic light changes between green, yellow, and/or red.

The traffic entity may have a predefined transmission range or area where the message is emitted. Therefore, the message may be receivable only in the predefined area or transmission range.

It is noted that the information on the environment can comprise a part or the entire message, e.g., a part or the entire content of the message. The information can be indicative of data, e.g., a position, a direction of movement, an acceleration, a velocity, a trajectory of one or more other transportation vehicles in the environment. The information can alternatively or additionally comprise any kind of other ("high-level") information on the traffic (e.g., legal traffic regulations, a (road) map of the environment) and/or on the situation (e.g., weather or road conditions) in the environment of the transportation vehicle.

In addition to the information, the transportation vehicle may also transmit sensor data from one or more on-board sensors (e.g., one or more LIDAR sensors, cameras, time-of-flight (TOF) cameras, radar sensors, ultra-sonic sensors, thermal imaging cameras, rain sensors, global positioning system interfaces, and/or motion sensors) to the remote control center.

Method 100 further comprises transmitting 130, by the transportation vehicle, the information to the remote control center for controlling the transportation vehicle from remote based on the information. The transportation vehicle, e.g., selects/extracts the information from the message before transmitting the information to the remote control center. For this reason, the transportation vehicle may be equipped with a data processing circuit configured to select/extract the information from the message. The transportation vehicle can emit/transmit the information wirelessly via a radio signal. In particular, the transportation vehicle can transmit the information out of the above transmission range or area of the traffic entity, e.g., to provide the information to the remote control center if the remote control center is located outside this area or transmission range. A skilled person having benefit from the present disclosure will appreciate that the transportation vehicle may comprise suitable technical methods or mechanisms for (wirelessly) transmitting 130 the information. The information, e.g., is transmitted via a cellular network to the remote control center. For example, the transportation vehicle uses cellular network communication technologies (e.g., second-, third-, fourth-, or fifth-generation (2G, 3G, 4G, or 5G) network technologies).

Method 100 may enable the remote control center to receive information from the message even if the remote control center is not able to receive the message (directly) from the traffic entity, e.g., if the remote control center is outside, i.e., not within or adjacent to, a transmission range of the traffic entity or a reception area of the message.

The skilled person having benefit from the present disclosure will appreciate that method 100 also allows to provide information from multiple received messages to the remote control center.

Method 100, e.g., comprises receiving a first message including first information on the environment of the transportation vehicle from a first traffic entity outside the transportation vehicle and receiving at least one second message including second information on the environment of the transportation vehicle from a second traffic entity outside the transportation vehicle.

It is noted that the above explanations in connection with the message, the information, and the traffic entity may also apply to the first and the second traffic entity, the first and the second information, and/or the first and the second message, respectively.

Each of the messages (the first and the second message) may comprise or correspond to a cooperative awareness message (CAM), a decentralized environmental notification message (DENM), a collective perception message (CPM) or signal phase and timing (SPaT), i.e., a message indicative of SPaT.

The first and the second traffic entity may be different traffic entities or the same traffic entity. For example, the first and the second traffic entity correspond to different other transportation vehicles or the same other transportation vehicle in the environment of the transportation vehicle. It is understood that the first and the second message can be received simultaneously or consecutively, i.e., one after the other. It is further understood that the method can also comprise receiving more than two messages.

The method 100 may further comprise collecting the first and the second information in a data container. The data container can be understood as a network packet, e.g., including data indicative of the first and the second information.

Method 100 may further comprise transmitting the data container to the remote control center. The data container can be equivalently transmitted, e.g., using the same technology, as explained above in connection with the information.

This allows to provide the information from multiple messages to the remote control center. Thus, an amount of information available to the remote control center may be increased. The remote control center may benefit from the increased amount of information when controlling the transportation vehicle from remote.

The method may further comprise removing redundancies (e.g., redundant/similar information) from the first and/or the second information. For example, similar information on the same other transportation vehicle in the environment of the transportation vehicle can be removed from the first or the second information. The redundancies, e.g., are removed while collecting the first and the second information in the data container. This can reduce a load on a communication path between the transportation vehicle and the remote control center when transmitting the data container to the remote control center. This may further increase a spectral efficiency of the communication between the remote control center and the transportation vehicle.

Method 100 can be executed iteratively. If method 100 is executed iteratively, multiple data containers including respective information can be transmitted consecutively. More particularly, the data containers may be transmitted periodically.

Method 100 can be performed by a communication circuit as described below.

Figure 2:
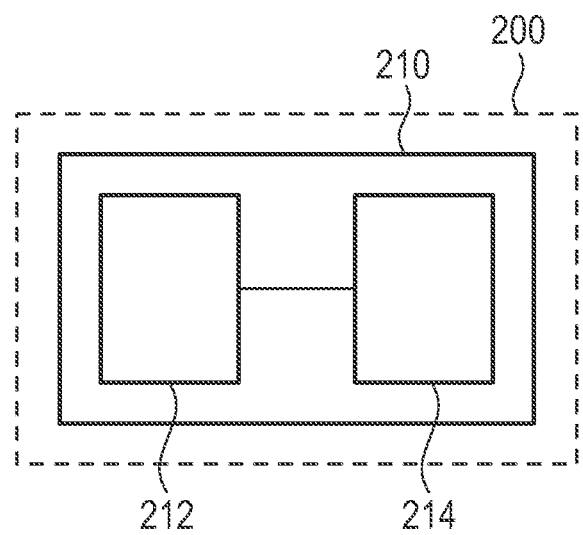
FIG. 2 illustrates a block diagram of an exemplary embodiment of a communication circuit for a transportation vehicle.

FIG. 2 illustrates a block diagram of an exemplary embodiment of a communication circuit 210 for a transportation vehicle 200.

The communication circuit 210 comprises one or more interfaces 212 configured to communicate in a communication network and a data processing circuit 214 configured to control the one or more interfaces 212. The data processing circuit 214 is configured to execute the above method for a transportation vehicle.

In disclosed embodiments, the one or more interfaces 212 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 212 may comprise further components to enable according communication in the (mobile) communication system, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 212 may be coupled to one or more antennas, which may correspond to any transmit and/or receive antennas, such as horn antennas, dipole antennas, patch antennas, sector antennas etc. In some examples the one or more interfaces 212 may serve the purpose of transmitting or receiving or both, transmitting and receiving, information, such as information, input data, control information, further information messages, etc.

As shown in FIG. 2 the respective one or more interfaces 212 are coupled to the respective data processing circuit 214 at the communication circuit 210. In disclosed embodiments the communication circuit 214 may be implemented using one or more processing units, one or more processing devices, any method or mechanism for processing, such as a processor, a computer or a programmable hardware component being operable with accordingly adapted software. In other words, the described functions of the data processing circuit 214 may as well be implemented in software, which is then executed on one or more programmable hardware components. Such hardware components may comprise a general-purpose processor, a Digital Signal Processor (DSP), a micro-controller, etc.

In particular, the one or more interfaces 212 can comprise at least one interface for wirelessly receiving the message embedded in a radio signal emitted by the traffic entity. More particular, the traffic entity may emit the radio signal within a limited range. In other words, the radio signal may have a limited range. The traffic entity, e.g., uses communication technology with limited range for the radio signal, thereby providing the message (only) to recipients within the range of the radio signal. Accordingly, the interfaces 212 may comprise at least one respective interface for receiving the message via such radio signals. The traffic entity, e.g., uses DSRC and/or geocast communication (technology). Accordingly, the one or more interfaces 212, e.g., comprise at least one DSRC communication interface and/or at least one geocast communication interface for receiving the message/ the signal via DSRC and/or geocast communication, respectively. It is noted that additionally or alternatively other interfaces may be used to receive the message.

The data processing circuit 214 may be configured to receive the message, e.g., via the radio signal, over the one or more interfaces 212. The data processing circuit 214 can extract the message from the received radio signal, e.g., through signal processing. The data processing circuit 214 may be further configured to extract the information from the message, e.g., through data processing. Optionally such data processing comprises decrypting the message and/or a content of the message. As described above, the information may be the entire or a part of the message or its content.

At least one of the one or more interfaces 212 is configured to communicate with the remote control center to transmit the information to the remote control center. In particular, the interfaces 212 comprise at least one interface configured to transmit the information to the remote control center via a wireless network, e.g., a cellular network, e.g., using 2G, 3G, 4G, and/or 5G network technology. The data processing circuit 214 may be configured to generate a communication signal bearing the information. Further, the data processing circuit 214 may be configured to transmit the information to the remote control center. For example, the data processing circuit 214 may use one or more of the above interfaces 212 for transmitting the information via the communication signal.

In some exemplary embodiments, the data processing circuit 214 may reroute the message to the remote control center through cellular communications. Hence, the data processing circuit 214 can be understood as message routing module (MRM).

It is noted that the communication circuit 210 may be used for applications in transportation vehicles, but also in communication applications for, e.g., robots or communication devices.

Transportation vehicle 200, e.g., is an automated vehicle (i.e., semi-autonomously or autonomously driving transportation vehicle). The above communication circuit 210 enables the transportation vehicle 200 to communicate information from messages which are locally receivable for the transportation vehicle 200 with the remote control center. More particularly, the communication circuit 210 (and the corresponding method 100) may provide a human or automatic tele-operating driver controlling the transportation vehicle 200 from remote with the information from the message, and thus, with an increased amount of information. This may improve the control of the transportation vehicle 200 from remote in tele-operated driving sessions. For example, the remote control center, the human, and or the automatic tele-operating driver can maneuver the transportation vehicle 200 more safely with respect to the information, e.g., the velocities, trajectories, and/or positions of transportation vehicles, and/or the timing of the traffic lights in the environment of the transportation vehicle 200, as laid out in more detail later.

FIG. 3 illustrates a block diagram of an exemplary embodiment of a method 300 for a remote control center and for communicating in a tele-operated driving session between a transportation vehicle and a remote control center.

Method 300 comprises receiving 310, by the remote control center, information on the environment of the transportation vehicle from a traffic entity indirectly via the transportation vehicle. As described above, the information may be extracted from a message locally available/receivable for the transportation vehicle and forwarded by the transportation vehicle to the remote control center. In particular, may comprise receiving the information via a communication path between the remote control center and the transportation vehicle over a cellular network. The communication path may be the same communication path which is used for the communication of control commands for controlling the transportation vehicle from remote. The skilled person having benefit from the present disclosure will appreciate that optionally other communication paths may be used, e.g., using other communication technology.

Method 300 further comprises controlling 320 the transportation vehicle using the information. For example, a human and/or an automatic tele-operating driver controlling the transportation vehicle may use the information as input for controlling the transportation vehicle.

It is noted that explanations to features of method 100 may also apply to respective features of method 300. In some applications, method 300 is implemented in combination with method 100.

Method 300 may further comprise processing the information into a human readable presentation of the information at the remote control center for controlling the transportation vehicle based on the human readable presentation of the information. The information, e.g., is encrypted and/or encoded such that a human may not be able to read/perceive the information. Method 300, e.g., comprises decrypting and/or decoding such information and processing the information into a visual representation of the information. The processing may also include reconstructing and displaying objects within the environment in a 3D scene, velocity vectors, and emergency messages. For example, method 300 comprises displaying positions, dimensions, velocities and/ or trajectories of other transportation vehicles and/or a timing and/or a state of traffic lights in the environment of the transportation vehicle for a human tele-operating driver controlling the transportation vehicle. The information, e.g., is displayed on a screen or display.

Method 300 can be performed by a communication circuit as described below.

FIG. 4 illustrates a block diagram of an exemplary embodiment of a communication circuit 410 for a remote control center 400 for remotely controlling a transportation vehicle.

The communication circuit 410 comprises one or more interfaces 412 configured to communicate in a communication network. The communication circuit 410 further comprises a data processing circuit 414 configured to control the one or more interfaces 412. The data processing circuit 414 is configured to execute method 300.

In disclosed embodiments the one or more interfaces 412 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 412 may comprise further components to enable according communication in the (mobile) communication system, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 412 may be coupled to one or more antennas, which may correspond to any transmit and/or receive antennas, such as horn antennas, dipole antennas, patch antennas, sector antennas etc. In some examples the one or more interfaces 412 may serve the purpose of transmitting or receiving or both, transmitting and receiving, information, such as information, input data, control information, further information messages, etc.

As shown in FIG. 4 the respective one or more interfaces 412 are coupled to the respective data processing circuit 414 at the communication circuit 410. In disclosed embodiments the communication circuit 414 may be implemented using one or more processing units, one or more processing devices, any method or mechanism for processing, such as a processor, a computer or a programmable hardware component being operable with accordingly adapted software. In other words, the described functions of the data processing circuit 414 may as well be implemented in software, which is then executed on one or more programmable hardware components. Such hardware components may comprise a general-purpose processor, a Digital Signal Processor (DSP), a micro-controller, etc.

In particular, the one or more interfaces 412 may comprise at least one interface for communicating with the transportation vehicle over a wireless, e.g., a cellular, network. The interfaces 412, e.g., comprise a cellular network interface, e.g., for access to a 5G network or a wireless local area network. Thus, the data processing circuit 414 can receive the information via the wireless network using one or more of the interfaces 412.

The data processing circuit 410 may be also configured to process the information into a human readable, e.g., a visual/graphic, representation.

The remote control center 400 may further comprise one or more screens for displaying the information (in a human readable representation), e.g., to a human tele-operating driver of the transportation vehicle.

An exemplary application of the above methods and communication circuits is described below with reference to FIG. 5.

Figure 5:
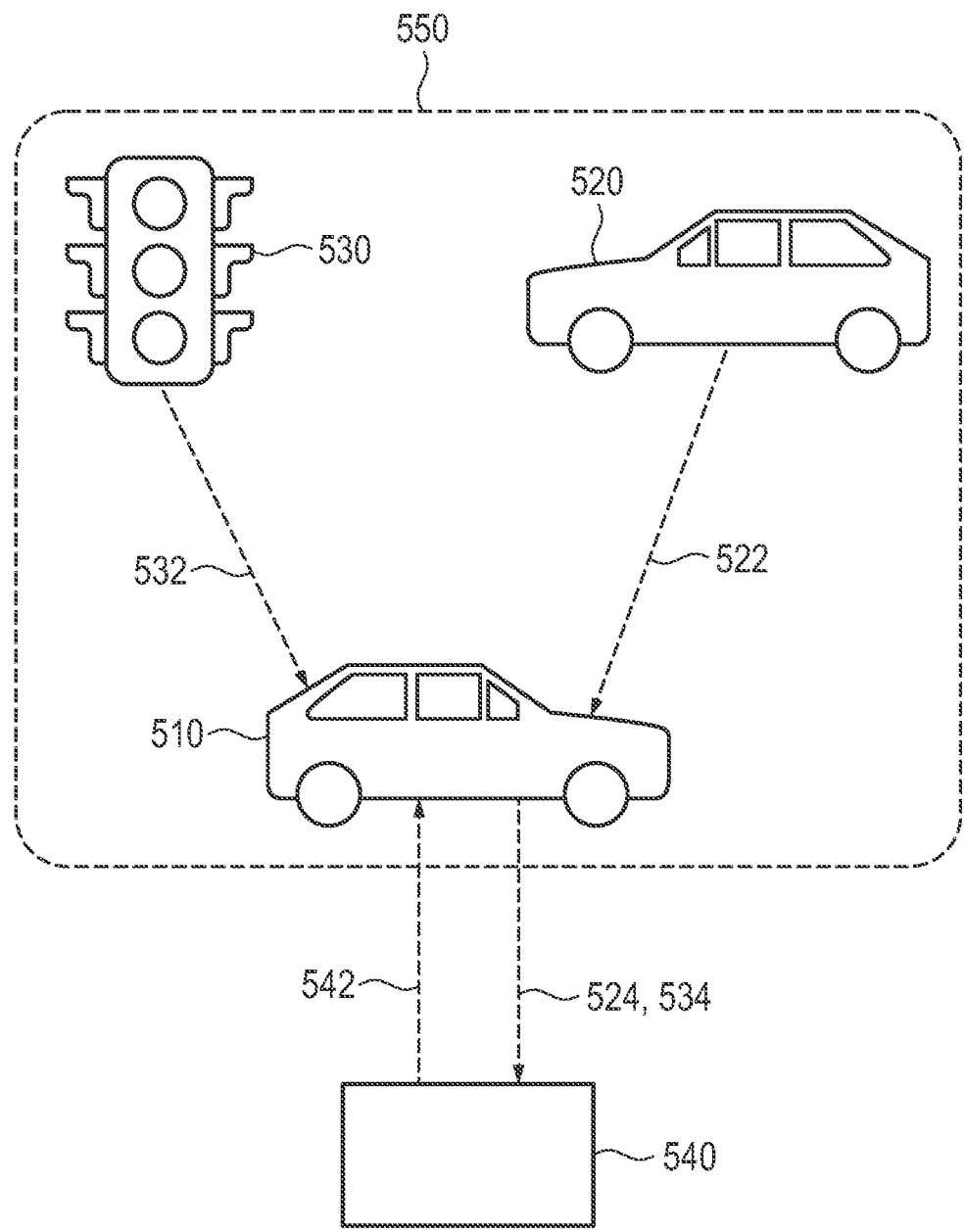
FIG. 5 schematically illustrates the communication of a transportation vehicle.

FIG. 5 schematically illustrates the communication of a transportation vehicle 510. Transportation vehicle 510, e.g., is an automated vehicle equipped with an exemplary embodiment of the communication circuit (i.e., the communication circuit for a transportation vehicle) described herein for communicating with another transportation vehicle 520 and a traffic light 530 in the environment of the transportation vehicle 510.

Transportation vehicle 520 is equipped with a DSRC transmitter for emitting a CAM 522. The traffic light 530, e.g., is equipped with another DSRC transmitter for emitting a SPaT (message) 532. As usual for DSRC, the CAM 522 and the SPaT 532 is (only) receivable in a predefined area 550, e.g., within a radius of a few 100 m. The predefined area 550, e.g., is indicative of a transmission range of the DSRC transmitters. Transportation vehicle 510 may use the CAM 522 and the SPaT 532 as input for maneuvering autonomously within the environment.

In an exemplary scenario, the transportation vehicle 510 gets into a deadlock situation. To handle the deadlock situation, the transportation vehicle 510 can establish a tele-operated driving session with a remote control center 540 for controlling the transportation vehicle 510.

The remote control center 540 is located outside the area 550. Hence, the remote control center 540 cannot receive the CAM 522 and/or the SPaT 532 from the traffic light 530 and/or the other transportation vehicle 520 via DSRC.

Transportation vehicle 510 can process the CAM 522 and the SPaT 532 to extract respective information 524 and 534 from the CAM 522 and the SPaT 532, respectively. Further, the transportation vehicle 510 may transmit the information 524 and 534 to the remote control center 540. As described above, the transportation vehicle 510, e.g., transmits the information 524 and 535 via a wireless network (e.g., a cellular network) out of the area 550 to the remote control center 540. Optionally, the transportation vehicle 510 can bundle the information 524 and 534 in a data container/network packet and transmit the information 524 and 534 in the data container to the remote control center 540. Further optionally, the transportation vehicle 510 can directly forward the CAM 522 and/or the SPaT 532 to the remote control center 540.

Also, the transportation vehicle 510 may transmit sensor data (e.g., time-of-flight (TOF) data, radar data, LIDAR data, camera images) of one or more on-board sensors (e.g., camera(s), TOF camera(s), LIDAR sensor(s), radar sensor(s)) to the remote control center 540.

This allows the remote control center 540 to analyze the environment using the sensor data, the information 524 and/or 534 and provide the transportation vehicle 510 based on the sensor data and/or the information 524 and/or 534 with one or more control commands 542 for controlling the transportation vehicle 510. The control commands 542 are optionally transmitted via the same wireless and/or cellular network as the information 524, 534. Alternatively, those are transmitted via a separate network or communication path.

It is noted that the above example may also apply to the communication of information from CPM, DENM, etc.

It is noted that tele-operated driving may be also used in situations other than deadlock situations. Thus, the explanations herein in connection with tele-operated driving in deadlock situations also applies to tele-operated driving in other situations.

As already mentioned, in disclosed embodiments the respective methods may be implemented as computer programs or codes, which can be executed on a respective hardware. Hence, another exemplary embodiment is a computer program having a program code for performing at least one of the above methods, when the computer program is executed on a computer, a processor, or a programmable hardware component. A further exemplary embodiment is a computer readable storage medium storing instructions which, when executed by a computer, processor, or programmable hardware component, cause the computer to implement one of the methods described herein.

LIST OF REFERENCE SIGNS 100 method for a transportation vehicle
110 establishing the tele-operated session 120 receiving a message
130 transmitting the information
200 transportation vehicle
210 communication circuit
212 one or more interfaces
214 data processing circuit
300 method for a remote control center
310 receiving information on the environment indirectly via the transportation vehicle
320 controlling the transportation vehicle
400 remote control center
410 communication circuit
412 one or more interfaces
414 data processing circuit
510 transportation vehicle
520 other transportation vehicle
522 CAM
530 traffic light
532 SPaT
540 remote control center
542 one or more control commands

The invention claimed is:

1. A communication circuit for a transportation vehicle, the communication circuit comprising:
one or more interfaces configured to communicate in a communication network; and
a data processing circuit configured to control the one or more interfaces, wherein the data processing circuit executes communication operations for a tele-operated driving session for the transportation vehicle controlled by a remote control center,
wherein the operations include:
establishment of the tele-operated driving session between the transportation vehicle and the remote control center using the communication network,
receipt, by the transportation vehicle, of a message including information indicating the environment of the transportation vehicle, the message being received directly from a traffic entity which is outside the transportation vehicle and is a stationary infrastructure, wherein the directly received message is transmitted and received via locally available transmission between the stationary traffic infrastructure entity and the transportation vehicle' communication circuit while the transportation vehicle is within a predefined transmission range/reception area of the stationary traffic infrastructure entity, wherein, thereafter, the information is received indirectly by the remote control center via relay by the transportation vehicle, and
transmission, by the transportation vehicle, of the received information to the remote control center over the communication network for use by the remote control center to remotely control the transportation vehicle during the tele-operated driving session based on the transmitted information.

2. The communication circuit of claim 1, wherein the data processing circuit receives the message from the stationary traffic infrastructure entity via vehicle-to-vehicle communication.

3. The communication circuit of claim 1, wherein the data processing circuit receives the message from the stationary traffic infrastructure entity via dedicated short-range communication (DSRC) and/or via geocast communication.

4. The communication circuit of claim 1, wherein the data processing circuit transmits the information via a cellular network to the remote control center.

5. The communication circuit of claim 1, wherein the message includes at least one of a cooperative awareness message (CAM), a decentralized environmental notification message (DENM), a collective perception message (CPM), and a signal phase and timing (SPaT).

6. The communication circuit of claim 1, wherein the communication circuit receives a first message including first information on the environment of the transportation vehicle from a first stationary traffic infrastructure entity outside the transportation vehicle, receives at least one second message including second information on the environment of the transportation vehicle from a second stationary traffic infrastructure outside the transportation vehicle, collects the first and the second information in a data container; and
transmits the data container to the remote control center.

7. The communication circuit of claim 1, wherein the one or more interfaces directly receive the message from the stationary traffic infrastructure entity in the predefined transmission range/reception area, wherein the message is only locally receivable/available for recipients within the predefined transmission range/reception area.

8. A transportation vehicle comprising the communication circuit of claim 1.

9. A communication circuit for a remote control center for remotely controlling a transportation vehicle, the communication circuit comprising:
one or more interfaces to communicate in a communication network; and
a data processing circuit to control the one or more interfaces, wherein the data processing circuit executes a method for the remote control center to communicate in a tele-operated driving session between the transportation vehicle and the remote control center, wherein the remote control center receives information indicating the environment of the transportation vehicle, wherein the information is received by the transportation vehicle directly from a traffic entity which is outside the transportation vehicle and is a stationary infrastructure, wherein the directly received message is transmitted and received via locally available transmission between the stationary traffic infrastructure entity and the transportation vehicle while the transportation vehicle is within a predefined transmission range/reception area of the stationary traffic infrastructure entity, wherein, thereafter, the information is received indirectly by the remote control center via relay by the transportation vehicle, and is used to control the transportation vehicle during the tele-operated driving session.

10. A remote control center for controlling a transportation vehicle from remote, the remote control center comprising the communication circuit of claim 9.

11. A method for a transportation vehicle and for communicating in a tele-operated driving session between the transportation vehicle and a remote control center, the method comprising:
establishing the tele-operated driving session between the transportation vehicle and the remote control center using the communication network,
receiving a message including information indicating the environment of the transportation vehicle, the message being received directly from a traffic entity which is outside the transportation vehicle and is a stationary infrastructure, wherein the directly received message is transmitted and received via locally available transmission between the stationary traffic infrastructure entity and the transportation vehicle' communication circuit while the transportation vehicle is within a predefined transmission range/reception area of the stationary traffic infrastructure entity, wherein, thereafter, the information is received indirectly by the remote control center via relay by the transportation vehicle, and transmitting the received information to the remote control center over the communication network for use by the remote control center to remotely control the transportation vehicle during the tele-operated driving session based on the transmitted information.

12. A non-transitory computer readable medium including a computer program having a program code for performing the communication method of claim 11 when the computer program is executed on a computer, a processor, or a programmable hardware component.

13. The method of claim 11, wherein the message is received from the stationary traffic infrastructure entity via vehicle-to-vehicle communication.

14. The method of claim 11, wherein the message is received from the stationary traffic infrastructure entity via dedicated short-range communication (DSRC) and/or via geocast communication.

15. The method of claim 11, wherein the transmitting of the information from the transportation vehicle is performed via a cellular network to the remote control center.

16. The method of claim 11, wherein the message includes at least one of a cooperative awareness message (CAM), a decentralized environmental notification message (DENM), a collective perception message (CPM), and a signal phase and timing (SPaT).

17. The method of claim 11, further comprising:
receiving a first message including first information on the environment of the transportation vehicle from a first stationary traffic infrastructure entity outside the transportation vehicle;
receiving at least one second message including second information on the environment of the transportation vehicle from a second stationary traffic infrastructure entity outside the transportation vehicle;
collecting the first and the second information in a data container; and
transmitting the data container to the remote control center.

18. A method for a remote control center and for communicating in a tele-operated driving session between the transportation vehicle and a remote control center, the method comprising:
receiving, by the remote control center, information indicating the environment of the transportation vehicle, wherein the information is received by the transportation vehicle directly from a traffic entity which is outside the transportation vehicle and is a stationary infrastructure, wherein the directly received message is transmitted and received via locally available transmission between the stationary traffic infrastructure entity and the transportation vehicle while the transportation vehicle is within a predefined transmission range/reception area of the stationary traffic infrastructure entity, wherein, thereafter, the information is received indirectly by the remote control center via relay by the transportation vehicle; and
controlling the transportation vehicle during the tele-operated driving session using the received information.

19. The method of claim 18, further comprising processing the information into a human readable presentation of the information at the remote control center for controlling the transportation vehicle based on the human readable presentation of the information.

20. The method of claim 11, wherein the one or more interfaces directly receive the message from the stationary traffic infrastructure entity in predefined transmission range/reception area, wherein the message is only locally receivable/available for recipients within the predefined transmission range/reception area.

21. The communication circuit of claim 6, wherein the communication circuit removes redundant information from the first and/or second information prior to transmission of the data container to the remote control center.

22. The method of claim 17, further comprising removing redundant information from the first and/or second information prior to transmission of the data container to the remote control center.

23. The communication circuit of claim 1, wherein the locally available indicated environment information relayed by the traffic vehicle to the remote control center indicates at least one of a position, a direction of movement, an acceleration, a velocity, or a trajectory of one or more other transportation vehicles in the environment and/or legal traffic regulations, a navigation data for the environment, and/or weather or road conditions.

24. The communication circuit of claim 9, wherein the locally available indicated environment information relayed by the traffic vehicle to the remote control center indicates at least one of a position, a direction of movement, an acceleration, a velocity, or a trajectory of one or more other transportation vehicles in the environment and/or legal traffic regulations, a navigation data for the environment, and/or weather or road conditions.

25. The method of claim 11, wherein the locally available indicated environment information relayed by the traffic vehicle to the remote control center indicates at least one of a position, a direction of movement, an acceleration, a velocity, or a trajectory of one or more other transportation vehicles in the environment and/or legal traffic regulations, a navigation data for the environment, and/or weather or road conditions.

26. The method of claim 18, wherein the locally available indicated environment information relayed by the traffic vehicle to the remote control center indicates at least one of a position, a direction of movement, an acceleration, a velocity, or a trajectory of one or more other transportation vehicles in the environment and/or legal traffic regulations, a navigation data for the environment, and/or weather or road conditions.

* * * * *